United States Patent [19]

Hauschild et al.

[11] 3,719,464

[45] March 6, 1973

[54] PREPARATION OF ALKALI CONTAINING CALCINED PHOSPHATE FERTILIZERS

[75] Inventors: Ulrich Hauschild, Hannover; Rudolf Holst, Hannover-Waldheim; Hans-Heinz Kaspers, Pattensen; Wolfgang Dahme, Rheinbrohl, all of Germany

[73] Assignee: Kali-Chemie Aktiengesellschaft, Hannover, Germany

[22] Filed: April 18, 1968

[21] Appl. No.: 722,189

[30] Foreign Application Priority Data

April 18, 1967 Germany ..................K 62041

[52] U.S. Cl. ..........................................71/45, 71/47
[51] Int. Cl. ..............................................C05b 13/00
[58] Field of Search............71/42, 45, 46, 34, 62, 47

[56] References Cited

UNITED STATES PATENTS

| 1,016,989 | 2/1912 | Gialt | 71/46 |
|---|---|---|---|
| 1,194,219 | 9/1916 | Newberry | 71/47 X |
| 1,823,849 | 9/1931 | Rothe et al. | 71/47 X |
| 1,842,843 | 1/1932 | Rothe et al. | 71/47 X |
| 1,878,185 | 9/1932 | Rothe et al. | 71/47 X |
| 1,880,491 | 10/1932 | Rothe et al. | 71/47 X |
| 3,202,477 | 8/1965 | Loeffler et al. | 23/63 |

FOREIGN PATENTS OR APPLICATIONS

| 467,075 | 1/1937 | Great Britain | 71/46 |
|---|---|---|---|

Primary Examiner—Reuben Friedman
Assistant Examiner—Richard Barnes
Attorney—Fritz G. Hochwald and Christen & Sabol

[57] ABSTRACT

In the preparation of alkali-calcium phosphate fertilizers by calcination of rock phosphate, silica, and an alkali metal oxide supplying compound in a rotary kiln, the alkali metal oxide is supplied partly as alkali metal carbonate and partly as concentrated aqueous alkali metal hydroxide solution.

7 Claims, No Drawings

PREPARATION OF ALKALI CONTAINING CALCINED PHOSPHATE FERTILIZERS

The invention relates to the production of phosphate fertilizers.

Valuable phosphate fertilizers have been prepared by thermal decomposition of raw phosphates, which are mostly fluorine-containing calcium phosphates of apatitic structure, in the presence of certain amounts of silica and compounds furnishing alkali metal oxides, at temperatures between 1,000 and 1,300°C. As alkali metal oxide supplying compounds, alkali metal hydroxides and carbonates have been proposed. However, most of these compounds are suitable reaction components only when the calcination is carried out on a laboratory scale.

Our own investigations have shown that the use of solid alkali metal hydroxide in a technical rotary kiln poses various problems. Particularly at high temperatures, the alkali metal hydroxide attacks the walls of the kiln and destroys them within a relatively short time. In addition, the raw material mixture tends, on its passage through the kiln, to form lumps and rings which interfere with normal kiln operation. The conditions become still more difficult when aqueous alkali metal hydroxide solutions are used for the calcination. Starting materials comprising alkali metal hydroxide solutions as they are obtained, for instance, in the alkali electrolysis, phosphate rock and sand are in a liquid to muddy or at best pasty state. When such mixtures are directly introduced in a rotary kiln, they stick to the walls like a concrete layer which grows until it clogs completely the kiln.

Less interference with the kiln operation is observed when alkali metal carbonates are used for the production of the alkali metal-calcium-silicophosphates. Said reaction has been carried out on a commercial scale only with sodium carbonate. Potassium carbonate could be used too but, so far, no such process for the technical production of potassium-calcium-silicophosphates has been found acceptable; this may be due to various reasons of economic, technical, and chemical nature. For instance, the great volatility of the potassium compounds renders the process uneconomic at high temperatures. A process disclosed in French Patent No. 1,189,773 where the calcium phosphate is decomposed by potassium carbonate at the relatively low temperatures of 550 to 900°C, requires very long reaction times and has the further drawback of using large amounts of alkali. Such excess of alkali causes difficulties in the use of the product, because the almost complete solubility of the $K_2O$ component produces a strong alkaline reaction in the soil. Therefore, mixed $K_2O$ - $P_2O_5$ fertilizers are usually prepared by simple admixture of potassium salts to the phosphate fertilizers obtained by calcination of raw phosphate-soda mixtures.

Said soda-raw phosphate calcination products have the drawback that the alkali metal component, when added as soda, is rather expensive. Therefore, it has been proposed to use alkali-containing slags, or alkali metal chlorides or sulfates, in the presence of steam. However, the results were not satisfactory.

It is a principal object of the invention to provide a process for the calcination of raw phosphates with alkali metal compounds and silica which avoids the difficulties recited above.

Other objects and advantages will be apparent from a consideration of the specification and claims.

In accordance with the invention, the alkali metal oxide furnishing component is supplied in such a way that 25 to 80 percent by weight of said alkali metal oxide is added as solid alkali metal carbonate while the balance is added in form of an aqueous solution which contains 40 to 70 percent by weight of alkali metal hydroxide. The mixture of the starting materials comprising the raw phosphate, the required amount of silica, and the above recited alkali metal compounds is then calcined in a basically lined rotary kiln at a maximum temperature between 1,000° and 1,300°C. For a successful operation, it is important to adjust the total amount of supplied alkali metal oxide $Me_2O$ to the $P_2O_5$ of the raw phosphate to a molar ratio in the range of 1.2:1 to 1.5:1.

As raw phosphate, any natural calcium phosphate such as Florida pebble phosphate, Curacao phosphate, and others can be used.

Suitable alkali metal hydroxides and carbonates are those of sodium, potassium, and mixtures thereof.

The silica component in the mixture is generally supplied in the form of sand and its amount must be so adjusted as to combine with the amount of CaO exceeding the molar ratio of 2 CaO: 1 $P_2O_5$ in form of $Ca_2SiO_4$.

For carrying out the process of the invention, the raw phosphate is mixed with the calculated amount of sand and with the alkali metal carbonate in a suitable apparatus such as a paddle screw or a drum mixer. The concentrated aqueous alkali metal hydroxide solution may be added in various ways. In a preferred embodiment of the invention, the alkali metal hydroxide solution is continuously sprayed on the raw phosphate-alkali metal carbonate mixture through nozzles arranged in the first third of the rotary kiln, which is operated in countercurrent. Thereby, the solution is applied to a mixture which is preheated by the waste gases coming from the heating zone, and forms therewith a friable to granulated mostly still somewhat moist mass. While this mass advances into the heating zone, the countercurrently flowing waste gases produce a further solidification of the grains due to after-drying and superficial carbonation.

When the waste gases contact the injected alkali metal hydroxide solution, alkali metal compounds evaporated in the heating zone are retained by the mixture. This makes it possible to use, wholly or in part, potassium compounds under economic conditions. On its further passage through the kiln, the granulated mixture shows no tendency to ring formation and can be heated without difficulty to the required maximum temperature and calcined. The product passes the rotary kiln without substantial formation of lumps and leaves it in flowable form.

It is also possible to mix the concentrated aqueous alkali metal hydroxide solution already outside the kiln with the other raw materials to a moist friable mass. Thereby, the granulation can be improved by contacting the raw material components during the mixing operation directly with the calcination waste gases of the kiln which generally have still a temperature of several hundred degrees centigrades. Particularly, when potassium compounds are used for the calcination process, said procedure is of advantage because, in this way, the compounds entrained with the waste gases can be separated therefrom and returned into the process. If a relatively small amount of concentrated alkali metal hydroxide solution is employed, a semi-dry to dry mixture may be produced. Readily decomposable products are obtained when, irrespective of the place of introduction of the alkali metal hydroxide solutions, the concentration of said solutions is in the range of 45 to 55 percent by weight and when the amount of alkali introduced in the form of alkali metal hydroxide is between 60 and 35 percent by weight of the total alkali. If aqueous sodium and potassium hydroxide solutions of equal concentration are compared, it is found that 5 to 20 percent more of the weight of the total alkali can be employed in the form of sodium hydroxide solutions.

It is a particular advantage of our process that a large part of the alkali component can be introduced in the form of alkali metal hydroxide solution as they are obtained in the alkali metal chloride electrolysis. As a result of the increasing industrial chlorine production, inherently increasing amounts of alkali metal hydroxide solution become available as a cheap decomposition agent for raw phosphates.

The calcination temperatures are between 1,000° and 1,300°C, preferably in the range of 1,050° and 1,250 C. While the sodium enriched products are generally produced in the higher temperature range of 1,100° to 1,250°C, temperature in the lower range of 1,050° to 1,150°C are sufficient for the production of the calcined potassium - phosphate fertilizers. The mixed alkali compositions require an intermediate temperature range.

Preferably, the process is carried out in continuous operation. The residence time of the calcination mixture in the rotary kiln is about ½ to 1½ hours, in the calcination zone proper about 15 minutes.

After calcination, the product is cooled in a suitable manner and then ground. Due to its $P_2O_5$ content of 25 to 30 percent, it presents a valuable phosphate fertilizer which is readily soluble in 2 percent citric acid solution, in ammonium citrate solution, and in the so-called Petermann solution. When potassium hydroxide and potassium carbonate are used, the product contains a second nutrient which, in this form, has excellent properties. The $K_2O$ content in the fertilizer may amount up to about 25 percent. As the water soluble $K_2O$ component is only about 20 percent of the total $K_2O$, the fertilizer has a longer fertilizing action than other commercial products. A further advantage is the high CaO content of the calcined phosphates which is available in basically effective form for the soil fertilization. By admixture of potassium salts, the $K_2O$ content can be adjusted for any purpose.

The following examples are given to illustrate but not to limit the invention. All percentage figures are given by weight.

EXAMPLE 1

One thousand kg of a calcium phosphate ore (37.2% $P_2O_5$) were mixed with 195 kg of soda, 290 kg of 50 percent aqueous sodium hydroxide solution and 80 kg of sand in a paddle screw and continuously passed into a basically lined rotary kiln. In the kiln, the mixture was heated to a maximum temperature of 1,270°C. During the passage of the material through the kiln, no difficulties due to ring or lump formation were observed. The obtained cooled calcined phosphate contained 29.2 percent of $P_2O_5$ and 39.6 percent of CaO. The solubility of the $P_2O_5$ in 2 percent citric acid solution was 99.5 percent, and in Petermann solution 98.5 percent.

EXAMPLE 2

A mixture was prepared which contained for 1,000 kg of a North African raw phosphate (37.4% $P_2O_5$; 50.8 % CaO; 2.5% $SiO_2$) 100 kg of soda and 80 kg of sand. Said mixture was continuously metered into a rotary kiln. At the same time, a 50 percent aqueous sodium hydroxide solution was continuously sprayed on the mixture inside the kiln, whereby 435 kg of said solution were used for 1,000 kg of the raw phosphate. Without any ring formation, the mixture could be heated in the kiln to a maximum temperature of 1,250°C. The thus obtained product contained 29.1 percent of $P_2O_5$ and 17.6 percent of $Na_2O$. The solubility of the $P_2O_5$ in citric acid solution was 99.6 percent and in Petermann solution 98.8 percent.

EXAMPLE 3

One thousand kg of a North African raw phosphate (37.2% $P_2O_5$; 50.4% CaO; 2.7% $SiO_2$) were charged together with 210 kg of soda and 80 kg of sand into a rotary kiln as described in Example 2. There, they were continuously sprayed with 366 kg of a 50 percent aqueous potassium hydroxide solution, whereby, under the influence of the hot waste gases from the calcination zone of the kiln, a granular mixture was produced. During the passage of the product through the kiln, no rings were formed on the walls and the calcined product was discharged in a free flowing state. The maximum calcination temperature was 1,190°C. The cooled product contained 28.1 percent of $P_2O_5$, 11.5 percent of $K_2O$, and 38.4 percent of CaO. The solubility of the $P_2O_5$ in citric acid was 99.8 percent and in Petermann solution 98.2 percent. Containing a total nutrient content of almost 40 percent, the product represented a valuable fertilizer.

EXAMPLE 4

One thousand kg of a calcium phosphate ore (37.3% $P_2O_5$; 50.7% CaO) were mixed in a paddle screw with 165 kg of soda. One hundred and seventy-one kg of 50 percent aqueous sodium hydroxide solution, 241 kg 50 percent aqueous potassium hydroxide solution, and 80 kg of sand, while the waste gases of the calcination were passed through said screw. Subsequently, they were charged into a rotary kiln provided with a basic lining. During the passage through the kiln, in which it was heated to a maximum temperature of 1,220°C, the mixture adhered only slightly to the walls. The calcined product contained 28.4 percent of $P_2O_5$, 38.7 percent of CaO, 12.4 percent of $Na_2O$, and 7.6 percent of $K_2O$. Its solubility in citric acid solution was 99.3 percent, in Petermann solution 98.1 percent.

EXAMPLE 5

Kola apatite (39.1% $P_2O_5$), potassium carbonate, and sand were continuously charged into a rotary kiln in which a 50 percent aqueous potassium hydroxide solution were sprayed on the mixture. The proportions were so adjusted that for 1,000 kg of the rock phosphate, 250 kg of potassium carbonate, 100 kg of sand, and 410 kg of the potassium hydroxide solution were employed. The mixture passed through the kiln without ring formation and was heated to a maximum temperature of 1,100°C. The cooled and ground calcination product contained 27.3 percent of $P_2O_5$ and 23.8 percent $K_2O$. The $P_2O_5$ solubility in 2 percent citric acid solution was 99.6 percent, in Petermann solution 98.9 percent.

We claim:

1. In the preparation of an alkali containing calcined phosphate fertilizer by calcination in a rotating kiln provided with a basic lining and at a maximum temperature of 1,000° to 1,300°C of a mixture of rock phosphate with alkali metal oxide supplying compounds wherein the alkali metal is selected from the group consisting of sodium, potassium and mixtures thereof in a molar ration of $P_2O_5$ to alkali metal oxide in the range of 1:1.2 to 1:1.5, and silica in an amount sufficient to combine as $Ca_2SiO_4$ with the CaO exceeding the molar ratio of 2 CaO:1 $P_2O_5$, the improvement which consists in employing 25 to 80 percent by weight of said alkali metal oxide supplying compounds in the form of solid alkali metal carbonate and 75 to 20 percent by weight in the form of an aqueous solution containing 40 to 70 percent by weight of alkali metal hydroxide, the $P_2O_5$ content of the fertilizer being substantially citrate soluble.

2. The process as claimed in claim 1 wherein 40 to 65 percent by weight of the alkali metal oxide supplying compound are applied in the form of solid alkali metal carbonate and 60 to 35 percent by weight are applied as an aqueous solution containing 45 to 55 percent by weight of alkali metal hydroxide.

3. The process as claimed in claim 1 wherein a mixture of rock phosphate, silica, and alkali metal carbonate is charged into said kiln and sprayed continuously in the first third of said kiln with said alkali metal hydroxide solution.

4. The procss as claimed in claim 1 wherein said alkali metal hydroxide solution is admixed to a mixture of rock phosphate, silica, and alkali metal carbonate before it is charged into said kiln.

5. The process as claimed in claim 4 comprising carrying out said admixture in a current of hot waste gases from said calcination.

6. The process as claimed in claim 1 wherein said alkali metal supplying compounds are sodium compounds and the maximum temperature in said rotary kiln is 1,100° to 1,250°C.

7. The process as claimed in claim 1 wherein said alkali metal supplying compounds are potassium compounds and the maximum temperature in said rotary kiln is 1,050° to 1,150°C.

* * * * *